United States Patent
Kubo et al.

(10) Patent No.: US 11,763,347 B2
(45) Date of Patent: Sep. 19, 2023

(54) CONTROL APPARATUS, SYSTEM, NON-TRANSITORY COMPUTER READABLE MEDIUM, TERMINAL APPARATUS, AND DETERMINATION METHOD

(71) Applicant: TOYOTA JIDOSHA KABUSHIKI KAISHA, Toyota (JP)

(72) Inventors: Chikage Kubo, Chofu (JP); Yusuke Kobayashi, Ota-ku (JP); Minoru Kubota, Toyota (JP); Kentaro Takahashi, Toyota (JP); Hideo Hasegawa, Nagoya (JP); Takashi Horiguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 97 days.

(21) Appl. No.: 17/314,488

(22) Filed: May 7, 2021

(65) Prior Publication Data

US 2021/0383433 A1    Dec. 9, 2021

(30) Foreign Application Priority Data

Jun. 8, 2020   (JP) .................... 2020-099678

(51) Int. Cl.
G06Q 30/02       (2023.01)
G06Q 30/0251     (2023.01)
G06Q 50/14       (2012.01)
G06Q 30/0207     (2023.01)
G01S 19/14       (2010.01)
G06Q 30/0283     (2023.01)
H04L 67/52       (2022.01)
G06Q 30/0242     (2023.01)

(52) U.S. Cl.
CPC .......... *G06Q 30/0266* (2013.01); *G01S 19/14* (2013.01); *G06Q 30/0224* (2013.01); *G06Q 30/0283* (2013.01); *G06Q 50/14* (2013.01); *H04L 67/52* (2022.05); *G06Q 30/0246* (2013.01); *G06Q 2240/00* (2013.01)

(58) Field of Classification Search
CPC .................................................... G06Q 30/02
See application file for complete search history.

(56) References Cited

U.S. PATENT DOCUMENTS

| | | | |
|---|---|---|---|
| 2009/0070186 A1* | 3/2009 | Buiten | G06Q 30/0257 705/14.58 |
| 2009/0150156 A1* | 6/2009 | Kennewick | G01C 21/3608 704/275 |
| 2010/0042493 A1 | 2/2010 | Nino et al. | |

(Continued)

FOREIGN PATENT DOCUMENTS

| | | |
|---|---|---|
| JP | 2003-050134 A | 2/2003 |
| JP | 2019-020172 A | 2/2019 |

(Continued)

*Primary Examiner* — Vincent M Cao
(74) *Attorney, Agent, or Firm* — Oliff PLC (57) ABSTRACT

A control apparatus includes a controller configured to determine whether a user who travels in a vehicle has stopped off at a place different from a destination, with reference to positional data indicating a position of the user, the user having accepted a recommendation to stop off at the place using the vehicle, the recommendation being presented together with an advertisement promoting the place.

14 Claims, 7 Drawing Sheets

(56) References Cited

U.S. PATENT DOCUMENTS

| | | | |
|---|---|---|---|
| 2011/0040626 A1* | 2/2011 | Lin | G01C 21/3697 |
| | | | 705/14.63 |
| 2013/0173393 A1* | 7/2013 | Calman | G06Q 30/0207 |
| | | | 705/14.66 |
| 2018/0150922 A1* | 5/2018 | Lyman | G06Q 50/14 |
| 2018/0216958 A1* | 8/2018 | Park | G01C 21/3614 |
| 2018/0357668 A1* | 12/2018 | Kanemoto | G06Q 30/0259 |
| 2019/0325480 A1 | 10/2019 | Suzuki et al. | |

FOREIGN PATENT DOCUMENTS

| | | | |
|---|---|---|---|
| JP | 2019191825 A | 10/2019 | |
| WO | 2017098803 A1 | 6/2017 | |

* cited by examiner

FIG 4

CONTROL APPARATUS, SYSTEM, NON-TRANSITORY COMPUTER READABLE MEDIUM, TERMINAL APPARATUS, AND DETERMINATION METHOD

CROSS-REFERENCE TO RELATED APPLICATION

This application claims priority to Japanese Patent Application No. 2020-099678, filed on Jun. 8, 2020, the entire contents of which are incorporated herein by reference.

TECHNICAL FIELD

The present disclosure relates to a control apparatus, a system, a program, a terminal apparatus, and a determination method.

BACKGROUND

Patent Literature (PTL) 1 describes technology for calculating a second route via a candidate location to a specific reference location on a first route from the current position of a vehicle to a destination such that the candidate location exists in a predetermined range from the reference location, based on request information indicating a desired arrival time at which a user on board the vehicle desires to arrive at the destination and a desired action which the user desires to take by the desired arrival time.

CITATION LIST

Patent Literature

PTL 1: JP 2019-020172 A

SUMMARY

In the technology described in PTL 1, even if a candidate location is recommended to the user, it is not known whether the user has actually stopped off at the candidate location; therefore, the effectiveness of the recommendation cannot be confirmed.

It would be helpful to confirm the effectiveness of a recommendation to stop off at a place different from a destination.

A control apparatus according to the present disclosure includes a controller configured to determine whether a user who travels in a vehicle has stopped off at a place different from a destination, with reference to positional data indicating a position of the user, the user having accepted a recommendation to stop off at the place using the vehicle, the recommendation being presented together with an advertisement promoting the place.

A program according to the present disclosure is configured to cause a computer to execute operations, the operations including:

presenting, to a user who travels in a vehicle, a recommendation to stop off at a place different from a destination using the vehicle together with an advertisement promoting the place; and transmitting, upon receipt of an operation to accept the recommendation, positional data indicating a position of the user to a control apparatus configured to determine whether the user has stopped off at the place.

A determination method according to the present disclosure includes:

receiving, by a control apparatus, positional data indicating a position of a user who travels in a vehicle from a terminal apparatus configured to present, to the user, a recommendation to stop off at a place different from a destination using the vehicle together with an advertisement promoting the place; and determining, by the control apparatus, whether the user has stopped off at the place with reference to the positional data.

According to the present disclosure, it is possible to confirm the effectiveness of a recommendation to stop off at a place different from a destination.

DETAILED DESCRIPTION

Hereinafter, an embodiment of the present disclosure will be described with reference to the drawings.

In the drawings, the same or corresponding portions are denoted by the same reference numerals. In the descriptions of the present embodiment, detailed descriptions of the same or corresponding portions are omitted or simplified, as appropriate.

Figure 1:
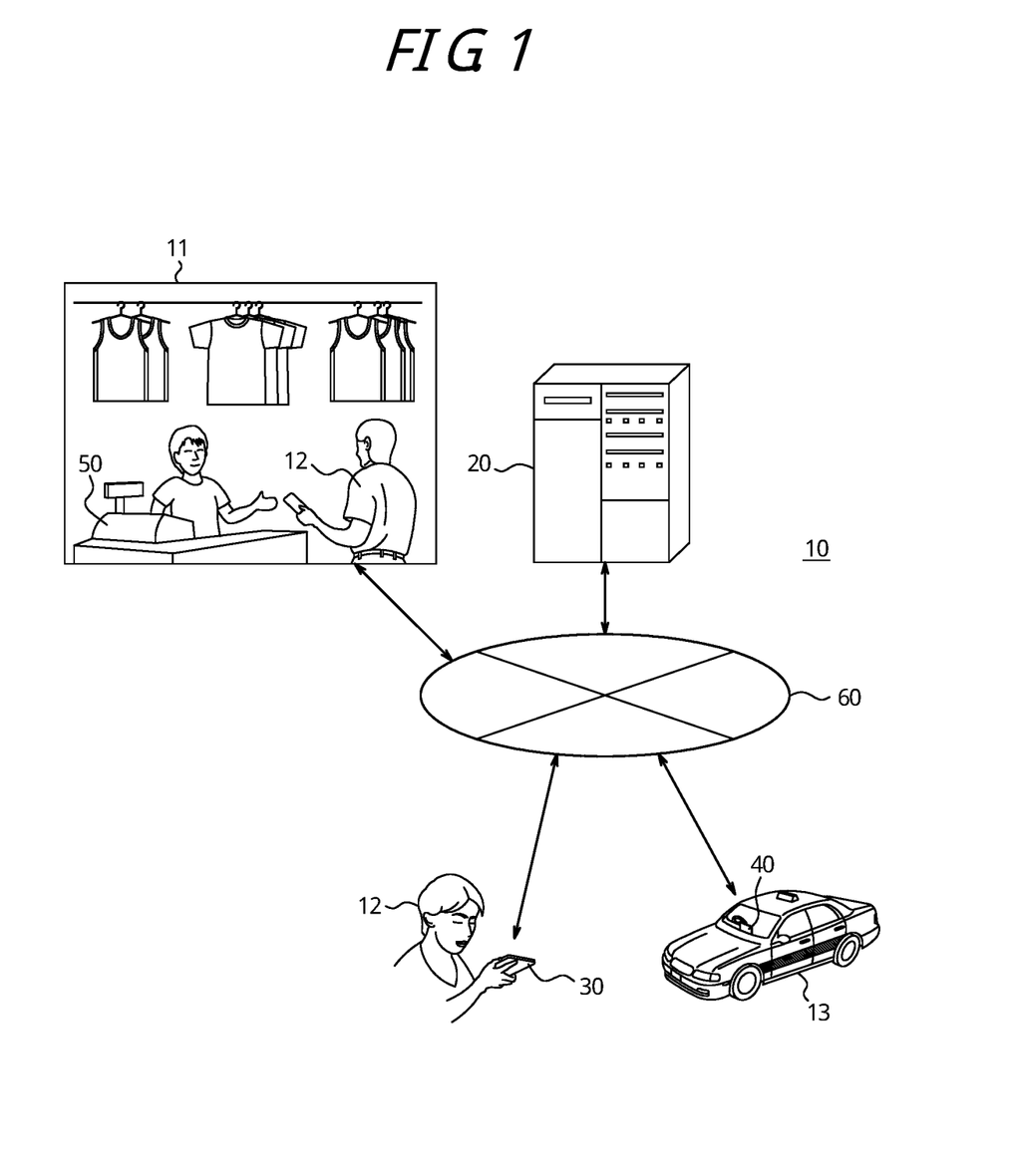
FIG. 1 is a diagram illustrating a configuration of a system according to an embodiment of the present disclosure.

A configuration of a system 10 according to the present embodiment will be described with reference to FIG. 1.

The system 10 according to the present embodiment includes at least one control apparatus 20, at least one first terminal apparatus 30, at least one second terminal apparatus 40, and at least one third terminal apparatus 50.

The control apparatus 20 can communicate with the first terminal apparatus 30, the second terminal apparatus 40, and the third terminal apparatus 50 via a network 60.

The network 60 includes the Internet, at least one WAN, at least one MAN, or a combination thereof. The term "WAN" is an abbreviation of wide area network. The term "MAN" is an abbreviation of metropolitan area network. The network 60 may include at least one wireless network, at least one optical network, or a combination thereof. The wireless network is, for example, an ad hoc network, a cellular network, a wireless LAN, a satellite communication network, or a terrestrial microwave network. The term "LAN" is an abbreviation of local area network.

The control apparatus 20 is installed in a facility such as a data center. The control apparatus 20 is, for example, a server that belongs to a cloud computing system or another type of computing system.

The first terminal apparatus 30 is held by a user 12 who travels in a vehicle 13. The first terminal apparatus 30 is, for example, a mobile device such as a mobile phone, a smartphone, or a tablet, or a PC. The term "PC" is an abbreviation of personal computer.

The second terminal apparatus 40 is mounted or installed in the vehicle 13. Alternatively, the second terminal apparatus 40 is held by a driver of the vehicle 13. The second terminal apparatus 40 is, for example, a vehicle-mounted device such as a car navigation device, a mobile device such as a mobile phone, a smartphone, or a tablet, or a PC.

The third terminal apparatus 50 is installed at a place 11 that sells goods or provides services, including a bank or a store such as a supermarket, a convenience store, a discount store, a department store, a toy store, a bookstore, an auto supply store, a clothing store, a sporting goods store, or a fast food store. Alternatively, the third terminal apparatus 50 is held by a staff member of the place 11. The third terminal apparatus 50 is, for example, a POS device such as a cash register, a mobile device such as a mobile phone, a smartphone, or a tablet, or a PC. The term "POS" is an abbreviation of point of sale.

The vehicle 13 is operated as a taxi or an on-demand bus and delivers the user 12 to a destination in the present embodiment, but may be driven to the destination by the user 12. The vehicle 13 is, for example, any type of automobile such as a gasoline vehicle, a diesel vehicle, an HV, a PHV, an EV, or an FCV. The term "HV" is an abbreviation of hybrid vehicle. The term "PHV" is an abbreviation of plug-in hybrid vehicle. The term "EV" is an abbreviation of electric vehicle. The term "FCV" is an abbreviation of fuel cell vehicle. The vehicle 13 is driven by a driver in the present embodiment, but the driving may be automated at any level. The automation level is, for example, any one of Level 1 to Level 5 according to the level classification defined by SAE. The name "SAE" is an abbreviation of Society of Automotive Engineers. The vehicle 13 may be a MaaS-dedicated vehicle. The term "MaaS" is an abbreviation of Mobility as a Service.

An outline of the present embodiment will be described with reference to FIGS. 1 and 2.

In the system 10 according to the present embodiment, the first terminal apparatus 30 presents, to a user 12 who travels in the vehicle 13, a recommendation to stop off at a place 11 different from a destination using the vehicle 13 together with an advertisement promoting the place 11. The control apparatus 20 receives positional data D1 indicating the position of the user 12 from the first terminal apparatus 30. Then, the control apparatus 20 determines whether the user 12 has stopped off at the place 11 with reference to the positional data D1.

According to the present embodiment, it is possible to confirm the effectiveness of the recommendation to stop off at the place 11 different from the destination.

Figure 2:
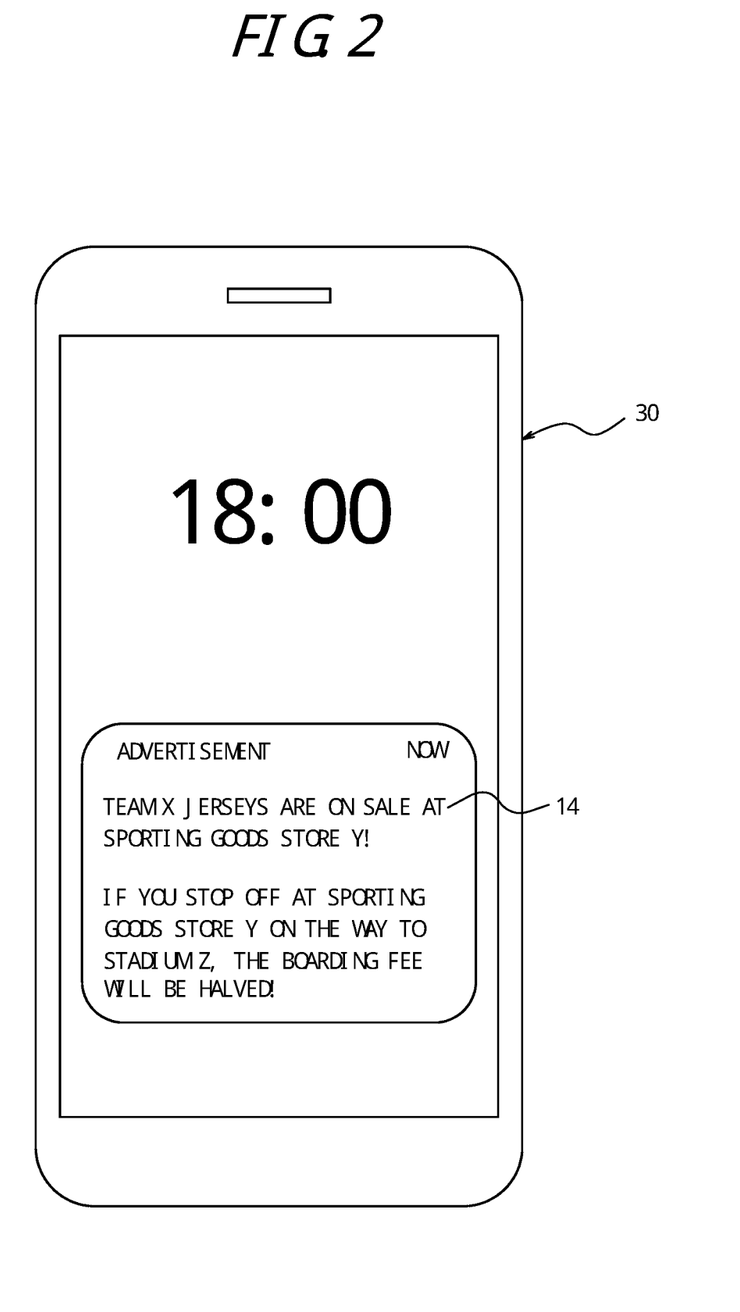
FIG. 2 is a diagram illustrating a screen example of a first terminal apparatus according to the embodiment of the present disclosure.

In the example of FIG. 2, a notification 14 is displayed on a screen of a smartphone serving as the first terminal apparatus 30. The notification 14 includes an advertisement promoting sporting goods store Y that serves as the place 11 with a message "Team X jerseys are on sale at sporting goods store Y!". The notification 14 further includes a recommendation to stop off at sporting goods store Y, which is different from stadium Z that serves as the destination, using the vehicle 13, in the form of a message "If you stop off at sporting goods store Y on the way to stadium Z, the boarding fee will be halved!". In a case in which the recommendation is accepted by the user 12, the positional data D1 indicating the position of the user 12 is transmitted from the first terminal apparatus 30 to the control apparatus 20. Then, whether the user 12 has stopped off at sporting goods store Y is determined with reference to the positional data D1.

Suppose that the user 12 has stopped off at sporting goods store Y and purchased a team X jersey, on the way to stadium Z using the vehicle 13 such as a taxi for watching a team X game. In this case, according to the present embodiment, it is known at least that the user 12 has stopped off at sporting goods store Y. Therefore, the recommendation to stop off at sporting goods store Y can be regarded to be effective.

Figure 3:
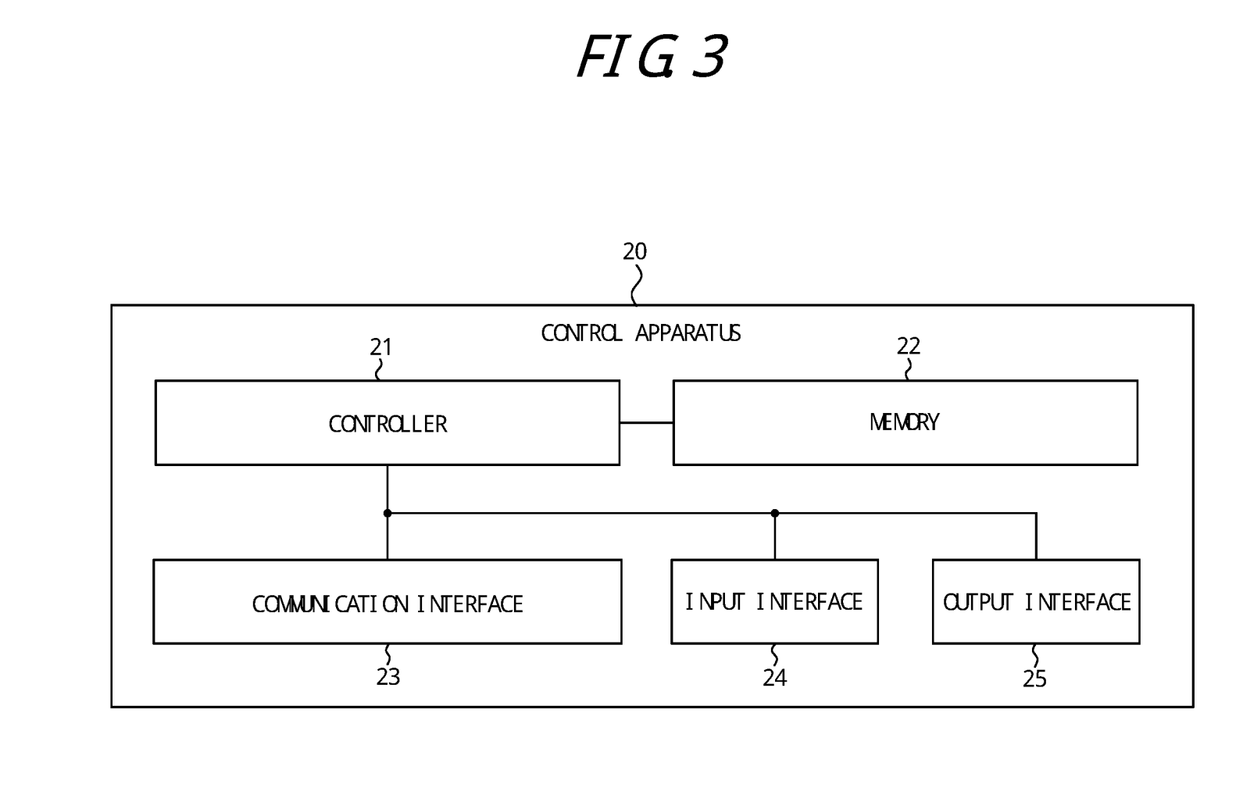
FIG. 3 is a block diagram illustrating a configuration of a control apparatus according to the embodiment of the present disclosure.

A configuration of the control apparatus 20 according to the present embodiment will be described with reference to FIG. 3.

The control apparatus 20 includes a controller 21, a memory 22, a communication interface 23, an input interface 24, and an output interface 25.

The controller 21 includes at least one processor, at least one dedicated circuit, or a combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The dedicated circuit is, for example, an FPGA or an ASIC. The term "FPGA" is an abbreviation of field-programmable gate array. The term "ASIC" is an abbreviation of application specific integrated circuit. The controller 21 executes processes related to operations of the control apparatus 20 while controlling each component of the control apparatus 20.

The memory 22 includes at least one semiconductor memory, at least one magnetic memory, at least one optical memory, or a combination of at least two of these. The semiconductor memory is, for example, RAM or ROM. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The memory 22 functions as, for example, a main memory, an auxiliary memory, or a cache memory. The memory 22 stores data to be used for the operations of the control apparatus 20 and data obtained by the operations of the control apparatus 20.

The communication interface 23 includes at least one interface for communication. The interface for communication is, for example, a LAN interface. The communication interface 23 receives data to be used for the operations of the control apparatus 20, and transmits data obtained by the operations of the control apparatus 20.

The input interface 24 includes at least one interface for input. The interface for input is, for example, a physical key, a capacitive key, a pointing device, a touch screen integrally provided with a display, or a microphone. The input interface 24 accepts an operation for inputting data to be used for the operations of the control apparatus 20. The input interface 24, instead of being included in the control apparatus 20, may be connected to the control apparatus 20 as an external input device. As the connection method, any technology such as USB, HDMI® (HDMI is a registered trademark in Japan, other countries, or both), or Bluetooth® (Bluetooth is a registered trademark in Japan, other countries, or both) can be used. The term "USB" is an abbreviation of Universal Serial Bus. The term "HDMI®" is an abbreviation of High-Definition Multimedia Interface.

The output interface 25 includes at least one interface for output. The interface for output is, for example, a display or a speaker. The display is, for example, an LCD or an organic EL display. The term "LCD" is an abbreviation of liquid crystal display. The term "EL" is an abbreviation of electro luminescence. The output interface 25 outputs data obtained by the operations of the control apparatus 20. The output interface 25, instead of being included in the control apparatus 20, may be connected to the control apparatus 20 as an external output device. As the connection method, any technology such as USB, HDMI®, or Bluetooth® can be used.

The functions of the control apparatus 20 are realized by execution of a control program according to the present embodiment by a processor serving as the controller 21. That is, the functions of the control apparatus 20 are realized by software. The control program causes a computer to execute the operations of the control apparatus 20, thereby causing the computer to function as the control apparatus 20. That is, the computer executes the operations of the control apparatus 20 in accordance with the control program to thereby function as the control apparatus 20.

The program can be stored on a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read out a program directly from the portable medium and execute processing according to the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the control apparatus 20 may be realized by a dedicated circuit serving as the controller 21. That is, some or all of the functions of the control apparatus 20 may be realized by hardware.

Figure 4:
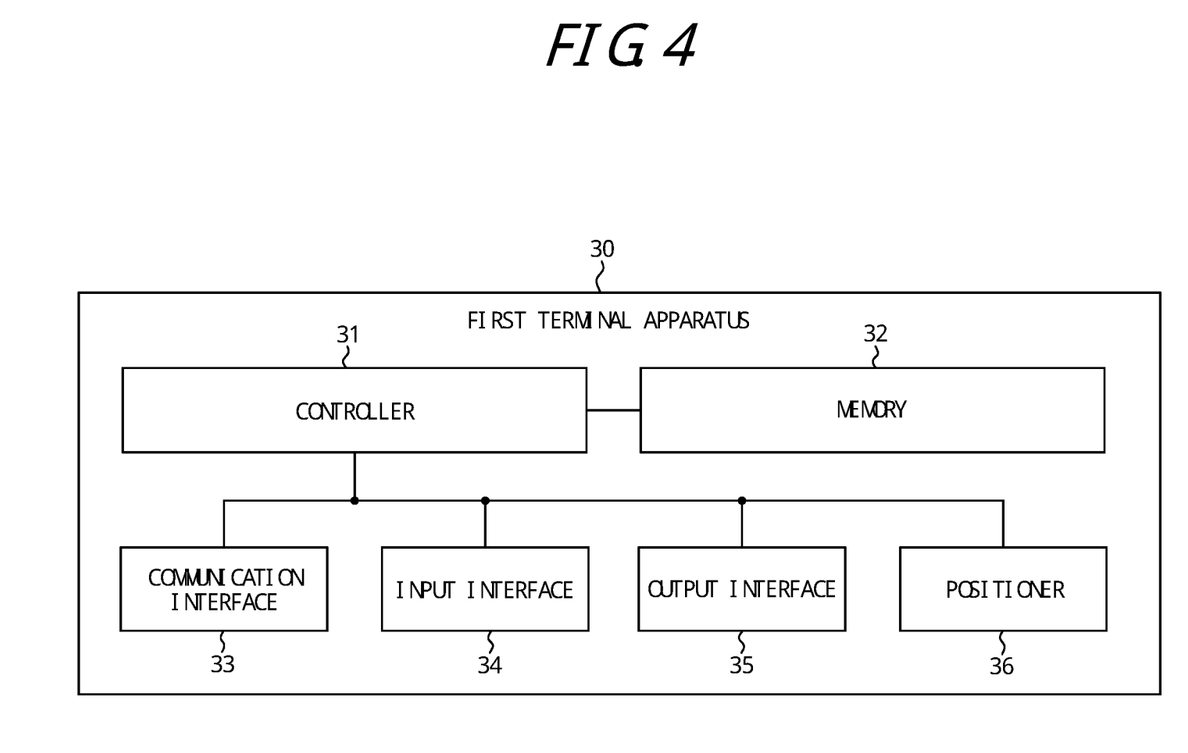
FIG. 4 is a block diagram illustrating a configuration of the first terminal apparatus according to the embodiment of the present disclosure.

A configuration of the first terminal apparatus 30 according to the present embodiment will be described with reference to FIG. 4.

The first terminal apparatus 30 includes a controller 31, a memory 32, a communication interface 33, an input interface 34, an output interface 35, and a positioner 36.

The controller 31 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The controller 31 executes processes related to operations of the first terminal apparatus 30 while controlling each component of the first terminal apparatus 30.

The memory 32 includes at least one semiconductor memory, at least one magnetic memory, at least one optical memory, or a combination of at least two of these. The semiconductor memory is, for example, RAM or ROM. The RAM is, for example, SRAM or DRAM. The ROM is, for example, EEPROM. The memory 32 functions as, for example, a main memory, an auxiliary memory, or a cache memory. The memory 32 stores data to be used for the operations of the first terminal apparatus 30 and data obtained by the operations of the first terminal apparatus 30.

The communication interface 33 includes at least one interface for communication. The interface for communication is, for example, an interface compliant with a mobile communication standard such as LTE, the 4G standard, or the 5G standard, an interface compliant with a short-range wireless communication standard such as Bluetooth®, or a LAN interface. The term "LTE" is an abbreviation of Long Term Evolution. The term "4G" is an abbreviation of 4th generation. The term "5G" is an abbreviation of 5th generation. The communication interface 33 receives data to be used for the operations of the first terminal apparatus 30, and transmits data obtained by the operations of the first terminal apparatus 30.

The input interface 34 includes at least one interface for input. The interface for input is, for example, a physical key, a capacitive key, a pointing device, a touch screen integrally provided with a display, or a microphone. The input interface 34 accepts an operation for inputting data to be used for the operations of the first terminal apparatus 30. The input interface 34, instead of being included in the first terminal apparatus 30, may be connected to the first terminal apparatus 30 as an external input device. As the connection method, any technology such as USB, HDMI®, or Bluetooth® can be used.

The output interface 35 includes at least one interface for output. The interface for output is, for example, a display or a speaker. The display is, for example, an LCD or an organic EL display. The output interface 35 outputs data obtained by the operations of the first terminal apparatus 30. The output interface 35, instead of being included in the first terminal apparatus 30, may be connected to the first terminal apparatus 30 as an external output device. As the connection method, any technology such as USB, HDMI®, or Bluetooth® can be used.

The positioner 36 includes at least one GNSS receiver. The term "GNSS" is an abbreviation of global navigation satellite system. GNSS is, for example, GPS, QZSS, GLONASS, or Galileo. The term "GPS" is an abbreviation of Global Positioning System. The term "QZSS" is an abbreviation of Quasi-Zenith Satellite System. QZSS satellites are called quasi-zenith satellites. The term "GLONASS" is an abbreviation of Global Navigation Satellite System. The positioner 36 measures the position of the first terminal apparatus 30.

The functions of the first terminal apparatus 30 are realized by execution of a first terminal program according to the present embodiment by a processor serving as the controller 31. That is, the functions of the first terminal apparatus 30 are realized by software. The first terminal program causes a computer to execute the operations of the first terminal apparatus 30, thereby causing the computer to function as the first terminal apparatus 30. That is, the computer executes the operations of the first terminal apparatus 30 in accordance with the first terminal program to thereby function as the first terminal apparatus 30.

Some or all of the functions of the first terminal apparatus 30 may be realized by a dedicated circuit serving as the controller 31. That is, some or all of the functions of the first terminal apparatus 30 may be realized by hardware.

Figure 5:
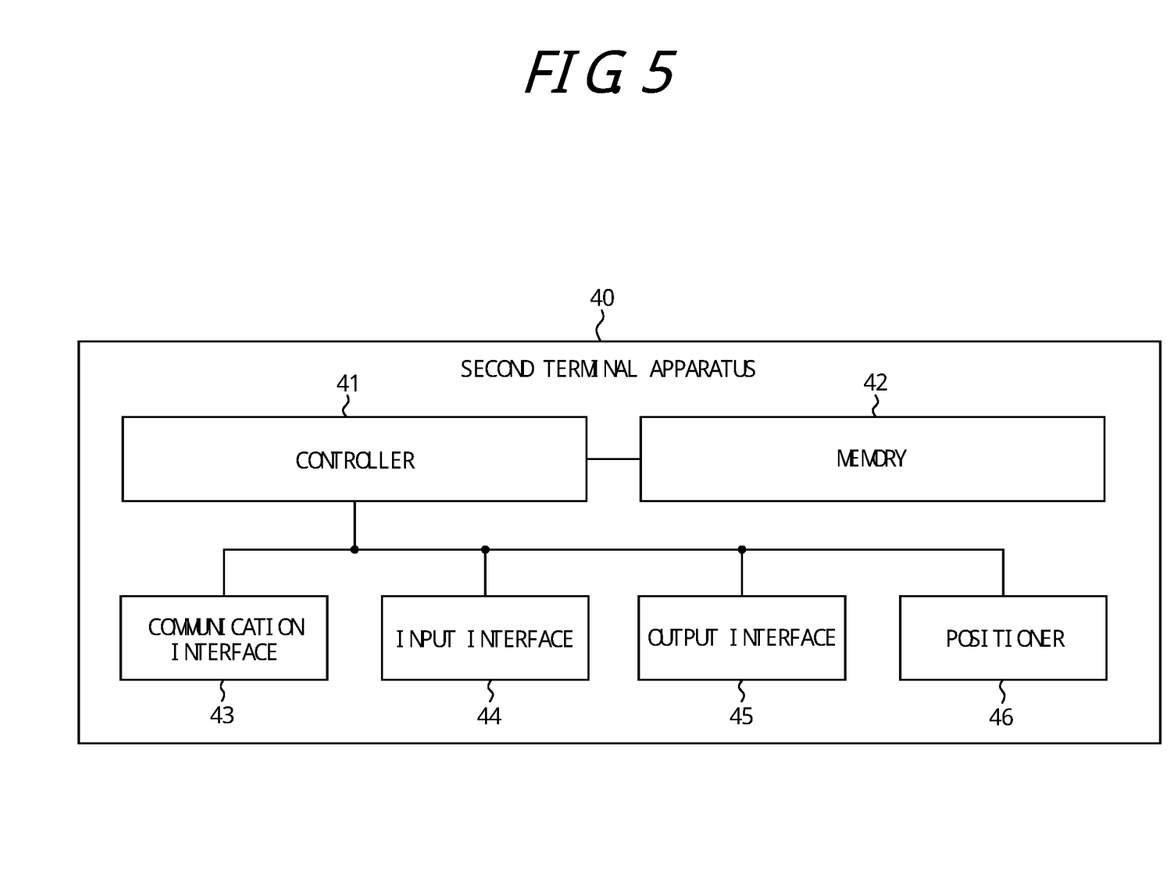
FIG. 5 is a block diagram illustrating a configuration of a second terminal apparatus according to the embodiment of the present disclosure.

A configuration of the second terminal apparatus 40 according to the present embodiment will be described with reference to FIG. 5.

The second terminal apparatus 40 includes a controller 41, a memory 42, a communication interface 43, an input interface 44, an output interface 45, and a positioner 46.

The controller 41 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The controller 41 may include at least one ECU. The term "ECU" is an abbreviation of electronic control unit. The controller 41 executes processes related to operations of the second terminal apparatus 40 while controlling each component of the second terminal apparatus 40.

The memory 42 includes at least one semiconductor memory, at least one magnetic memory, at least one optical memory, or a combination of at least two of these. The semiconductor memory is, for example, RAM or ROM. The RAM is, for example, SRAM or DRAM. The ROM is, for example, EEPROM. The memory 42 functions as, for example, a main memory, an auxiliary memory, or a cache memory. The memory 42 stores data to be used for the operations of the second terminal apparatus 40 and data obtained by the operations of the second terminal apparatus 40.

The communication interface 43 includes at least one interface for communication. The interface for communication is, for example, an interface compliant with a mobile communication standard such as LTE, the 4G standard, or the 5G standard, an interface compliant with a short-range wireless communication standard such as Bluetooth®, or a LAN interface. The communication interface 43 receives data to be used for the operations of the second terminal apparatus 40, and transmits data obtained by the operations of the second terminal apparatus 40.

The input interface 44 includes at least one interface for input. The interface for input is, for example, a physical key, a capacitive key, a pointing device, a touch screen integrally provided with a display, or a microphone. The input interface 44 accepts an operation for inputting data to be used for the operations of the second terminal apparatus 40. The input interface 44, instead of being included in the second terminal apparatus 40, may be connected to the second terminal apparatus 40 as an external input device. As the connection method, any technology such as USB, HDMI®, or Bluetooth® can be used.

The output interface 45 includes at least one interface for output. The interface for output is, for example, a display or a speaker. The display is, for example, an LCD or an organic EL display. The output interface 45 outputs data obtained by the operations of the second terminal apparatus 40. The output interface 45, instead of being included in the second terminal apparatus 40, may be connected to the second terminal apparatus 40 as an external output device such as a display audio. As the connection method, any technology such as USB, HDMI®, or Bluetooth® can be used.

The positioner 46 includes at least one GNSS receiver. GNSS is, for example, GPS, QZSS, GLONASS, or Galileo. The positioner 46 measures the position of the second terminal apparatus 40.

The functions of the second terminal apparatus 40 are realized by execution of a second terminal program according to the present embodiment by a processor serving as the controller 41. That is, the functions of the second terminal apparatus 40 are realized by software. The second terminal program causes a computer to execute the operations of the second terminal apparatus 40, thereby causing the computer to function as the second terminal apparatus 40. That is, the computer executes the operations of the second terminal apparatus 40 in accordance with the second terminal program to thereby function as the second terminal apparatus 40.

Some or all of the functions of the second terminal apparatus 40 may be realized by a dedicated circuit serving as the controller 41. That is, some or all of the functions of the second terminal apparatus 40 may be realized by hardware.

A configuration of the third terminal apparatus 50 is almost the same as the configuration of the first terminal apparatus 30, and thus a description is omitted; however, for example, if the third terminal apparatus 50 is a POS device, the configuration essential to a general POS device should be included in addition to the same configuration as the first terminal apparatus 30.

Figure 6:
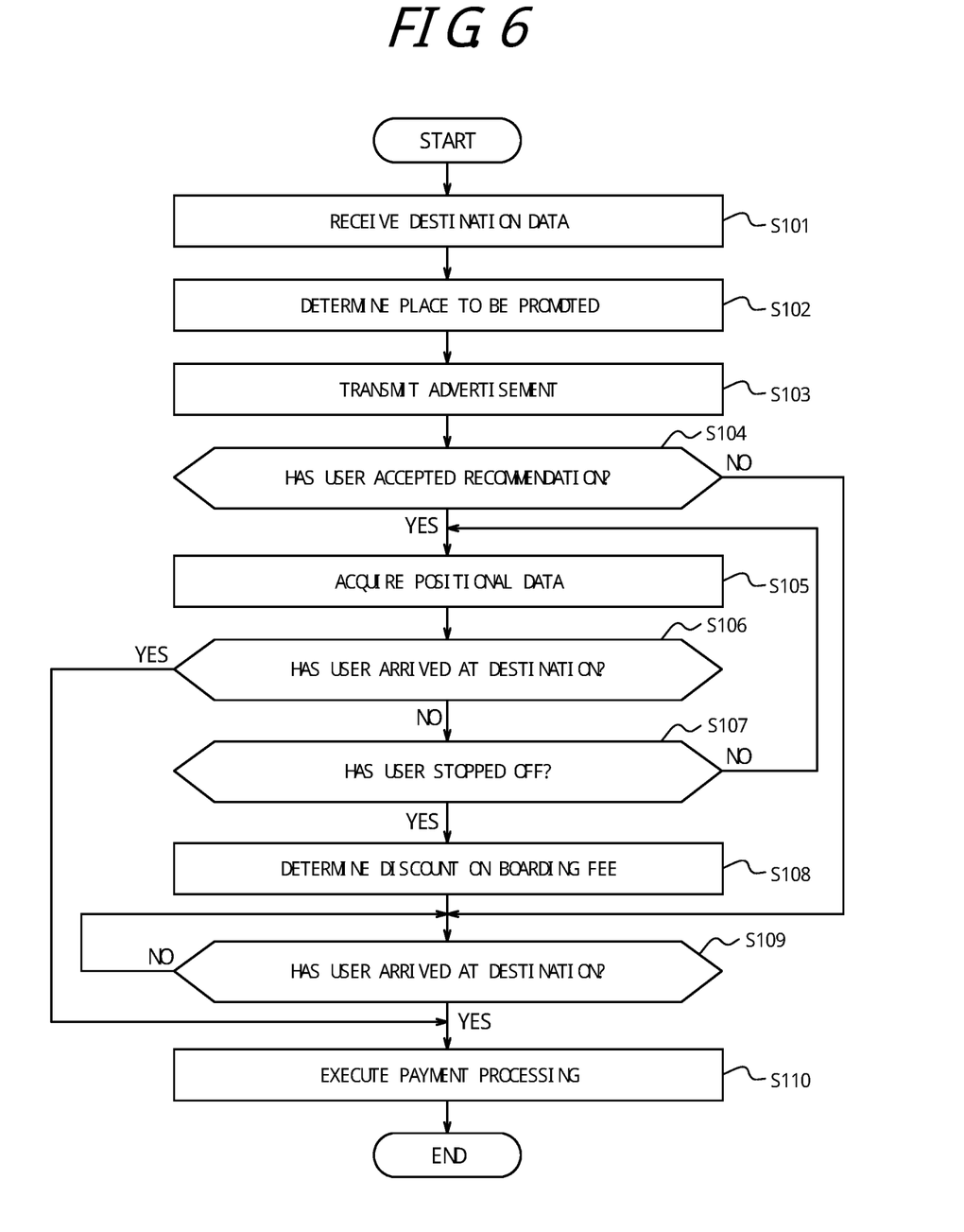
FIG. 6 is a diagram illustrating operations of the system according to the embodiment of the present disclosure.
Figure 7:
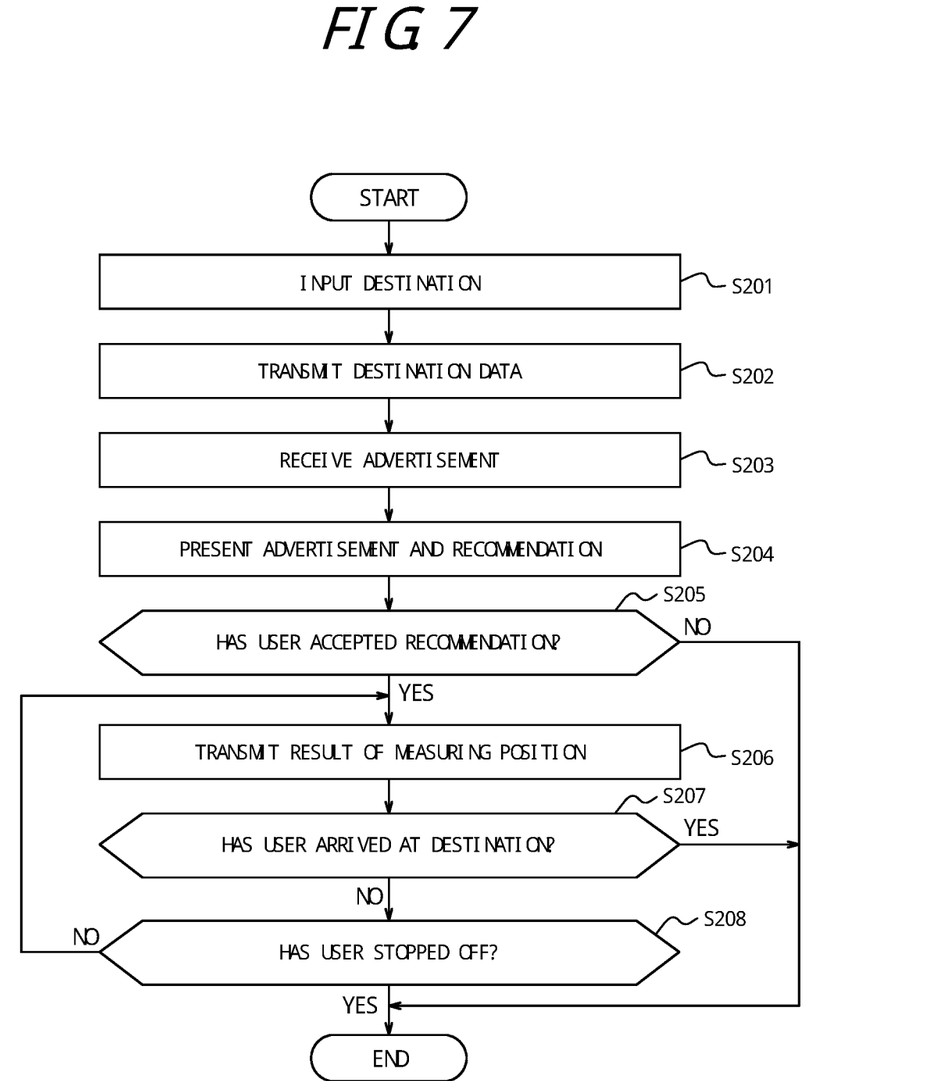
FIG. 7 is a diagram illustrating operations of the system according to the embodiment of the present disclosure.

Operations of the system 10 according to the present embodiment will be described with reference to FIGS. 6 and 7. These operations correspond to a determination method according to the present embodiment. FIG. 6 illustrates operations of the control apparatus 20. FIG. 7 illustrates operations of the first terminal apparatus 30.

In step S201 of FIG. 7, the controller 31 of the first terminal apparatus 30 accepts, with the input interface 34, an operation to input destination data D2 by a user 12 who travels in the vehicle 13. The destination data D2 is data indicating a destination. The destination data D2 may include data indicating a location at which the user 12 boards.

In the example of FIG. 2, the controller 31 of the first terminal apparatus 30 accepts, with the input interface 34 such as a touch screen, an operation to input the destination data D2 by the user 12 at the time of boarding or before boarding. The destination data D2 is data indicating the name, the address, or the position of stadium Z that serves as the destination. The position is indicated by, for example, two-dimensional coordinates or three-dimensional coordinates. The destination data D2 may include data indicating the address or the position of the user's home that serves as the location at which the user 12 boards. Alternatively, the destination data D2 may include data indicating the name, the address, or the position of a facility such as a station that serves as the location at which the user 12 boards.

In step S202 of FIG. 7, the controller 31 of the first terminal apparatus 30 controls the communication interface 33 to transmit the destination data D2 input in step S201. The communication interface 33 transmits the destination data D2 to the control apparatus 20.

In step S101 of FIG. 6, the communication interface 23 of the control apparatus 20 receives, from the first terminal apparatus 30, the destination data D2 transmitted in step S202 of FIG. 7. The controller 21 of the control apparatus 20 acquires the destination data D2 received by the communication interface 23.

In step S102 of FIG. 6, the controller 21 of the control apparatus 20 determines a place 11 different from the destination according to the destination, the position of the vehicle 13, and/or the location at which the user 12 boards, before step S203 of FIG. 7, namely, before a recommendation to stop off at the place 11 using the vehicle 13 is presented, to the user 12, together with an advertisement promoting the place 11.

The place 11 may be determined in any procedure, but, in the present embodiment, is determined in the following procedure.

The positioner 46 of the second terminal apparatus 40 measures the position of the second terminal apparatus 40. The controller 41 of the second terminal apparatus 40 controls the communication interface 43 to transmit a result of measuring the position by the positioner 46. The communication interface 43 transmits, to the control apparatus 20, the result of measuring the position by the positioner 46 as positional data D3 indicating the position of the vehicle 13.

The communication interface 23 of the control apparatus 20 receives the positional data D3 transmitted from the second terminal apparatus 40. The controller 21 of the control apparatus 20 acquires the positional data D3 received by the communication interface 23.

The controller 21 of the control apparatus 20 retrieves a route R1 from the position of the vehicle 13 indicated by the acquired positional data D3 to the destination indicated by the destination data D2 acquired in step S101, with reference to map data D4. The map data D4 may be stored in advance in the memory 22 of the control apparatus 20, or may be accumulated in an external system such as an Internet-based GIS. The term "GIS" is an abbreviation of geographic information system. The controller 21 may retrieve the route R1 independently, or may retrieve the route R1 using an external system such as an Internet-based GIS. The controller 21 determines, as the place 11, a location which is on the retrieved route R1 and related to the destination, with reference to the map data D4. Whether a location is related to the destination is determined with reference to metadata included in the map data D4. The controller 21 may determine, as the place 11, a location which is not on the retrieved route R1 in a case in which the difference in distance or required time between the route R1 and a route to reach the destination via the location is less than a first threshold V1. The controller 21 may calculate the distance or the required time independently, or may calculate the distance or the required time using an external system such as an Internet-based GIS.

In the example of FIG. 2, the controller 21 of the control apparatus 20 retrieves, as the route R1, a route from the position of the vehicle 13 indicated by the positional data D3 to the position of stadium Z that is identified by the name or the address of stadium Z indicated by the destination data D2, or to the position of stadium Z directly indicated by the destination data D2, with reference to the map data D4. Suppose that sporting goods store Y is on the route R1. Alternatively, suppose that the difference in distance or required time between the route R1 and a route to reach stadium Z via sporting goods store Y is less than the first threshold V1. In such cases, sporting goods store Y, which sells team X jerseys, is related to stadium Z, a game venue of team X, and thus the controller 21 determines sporting goods store Y as the place 11.

In a case in which the destination data D2 includes the data indicating the location at which the user 12 boards, the place 11 may be determined according to a route R2 from the location at which the user 12 boards to the destination, instead of the route R1 from the position of the vehicle 13 to the destination. That is, the controller 21 of the control apparatus 20 may retrieve, instead of the route R1, a route R2 from the location of boarding indicated by the destination data D2 acquired in step S101 to the destination indicated by the destination data D2, with reference to the map data D4.

The place 11 may be determined according to a positional relationship R3 with the destination, instead of the route R1 from the position of the vehicle 13 to the destination, or the route R2 from the location at which the user 12 boards to the destination. Specifically, the controller 21 of the control apparatus 20 may determine, as the place 11, a location which is close to the destination indicated by the destination data D2 acquired in step S101 and is related to the destination, with reference to the map data D4. Whether a candidate location is close to the destination is determined by comparing the distance or the required time between the candidate location and the destination with a second threshold V2.

The place 11 may be determined according to a positional relationship R4 with the position of the vehicle 13, instead of the positional relationship R3 with the destination. Specifically, the controller 21 of the control apparatus 20 may determine, as the place 11, a location which is close to the position of the vehicle 13 indicated by the acquired positional data D3 and is related to the destination, with reference to the map data D4. Whether a candidate location is close to the position of the vehicle 13 is determined by comparing the distance or the required time between the candidate location and the position of the vehicle 13 with a third threshold V3.

In a case in which the destination data D2 includes the data indicating the location at which the user 12 boards, the place 11 may be determined according to a positional relationship R5 with the location at which the user 12 boards, instead of the positional relationship R3 with the destination, or the positional relationship R4 with the position of the vehicle 13. Specifically, the controller 21 of the control apparatus 20 may determine, as the place 11, a location which is close to the location of boarding indicated by the destination data D2 acquired in step S101 and is related to the destination, with reference to the map data D4. Whether a candidate location is close to the location at which the user 12 boards is determined by comparing the distance or the required time between the candidate location and the location at which the user 12 boards with a fourth threshold V4.

The place 11 may be determined, whether related to the destination or not. Alternatively, in a case in which the destination data D2 includes the data indicating the location at which the user 12 boards, a location related to the location at which the user 12 boards, instead of being related to the destination, or as well as being related to the destination, may be determined as the place 11. Whether a location is related to the location at which the user 12 boards is determined with reference to metadata included in the map data D4.

In step S103 of FIG. 6, the controller 21 of the control apparatus 20 generates an advertisement promoting the place 11 determined in step S102. The controller 21 controls the communication interface 23 to transmit the generated advertisement. The communication interface 23 transmits the advertisement to the first terminal apparatus 30.

In the example of FIG. 2, the controller 21 of the control apparatus 20 generates an advertisement promoting sporting goods store Y that serves as the place 11 with a message "Team X jerseys are on sale at sporting goods store Y!". The controller 21 adds, to the generated advertisement, a recommendation to stop off at sporting goods store Y, which is different from stadium Z that serves as the destination, using the vehicle 13, in the form of a message "If you stop off at sporting goods store Y on the way to stadium Z, the boarding fee will be halved!".

In step S203 of FIG. 7, the communication interface 33 of the first terminal apparatus 30 receives, from the control apparatus 20, the advertisement transmitted in step S103 of FIG. 6. The controller 31 of the first terminal apparatus 30 acquires the advertisement received by the communication interface 33.

In step S204 of FIG. 7, the controller 31 of the first terminal apparatus 30 presents, to the user 12 who travels in the vehicle 13, a recommendation to stop off at the place 11 that is promoted by the advertisement acquired in step S203, using the vehicle 13, together with the advertisement.

In the example of FIG. 2, the controller 31 of the first terminal apparatus 30 controls the output interface 35 such as a display to output a notification 14. The controller 31 includes, in the notification 14, the recommendation added to the acquired advertisement together with the advertisement. Therefore, the notification 14 includes the advertisement promoting sporting goods store Y that serves as the place 11 with the message "Team X jerseys are on sale at sporting goods store Y!". The notification 14 further includes the recommendation to stop off at sporting goods store Y, which is different from stadium Z that serves as the destination, using the vehicle 13, in the form of the message "If you stop off at sporting goods store Y on the way to stadium Z, the boarding fee will be halved!".

In step S205 of FIG. 7, in a case in which an operation to accept the recommendation presented in step S204 by the user 12 is performed, the controller 31 of the first terminal apparatus 30 accepts the operation with the input interface 34. The controller 31 generates acceptance data D5 indicating that the user 12 has accepted the recommendation. The controller 31 controls the communication interface 33 to transmit the generated acceptance data D5. The communication interface 33 transmits the acceptance data D5 to the control apparatus 20. Then, a process in step S206 is performed. In a case in which the operation to accept the recommendation is not performed, the flow of FIG. 7 ends.

In the example of FIG. 2, the controller 31 of the first terminal apparatus 30 accepts, with the input interface 34 such as a touch screen, a GUI operation such as the user 12 simply opening the notification 14, or opening the notification 14 and pressing an "accept" button. The term "GUI" is an abbreviation of graphical user interface.

In step S104 of FIG. 6, the controller 21 of the control apparatus 20 determines whether the recommendation to stop off at the place 11 determined in step S102, using the vehicle 13, has been accepted by the user 12. In a case in which the recommendation has been accepted by the user 12, a process in step S105 is performed. In a case in which the recommendation has not been accepted by the user 12, a process in step S109 is performed.

Specifically, in a case in which the acceptance data D5 is transmitted in step S205 of FIG. 7, the communication interface 23 of the control apparatus 20 receives the acceptance data D5. The controller 21 of the control apparatus 20 acquires the acceptance data D5 received by the communication interface 23. In this case, the controller 21 determines that the recommendation to stop off at the place 11 using the vehicle 13 has been accepted by the user 12. In a case in which the acceptance data D5 is not transmitted in step S205 of FIG. 7, the acceptance data D5 is not received by the communication interface 23, and thus the controller 21 determines that the recommendation has not been accepted by the user 12.

In step S206 of FIG. 7, the positioner 36 of the first terminal apparatus 30 measures the position of the first terminal apparatus 30. The controller 31 of the first terminal apparatus 30 controls the communication interface 33 to transmit a result of measuring the position by the positioner 36. The communication interface 33 transmits, to the control apparatus 20, the result of measuring the position by the positioner 36 as positional data D1 indicating the position of the user 12.

In step S105 of FIG. 6, the communication interface 23 of the control apparatus 20 receives, from the first terminal apparatus 30, the positional data D1 transmitted in step S206 of FIG. 7. The controller 21 of the control apparatus 20 acquires the positional data D1 received by the communication interface 23.

In step S106 of FIG. 6, the controller 21 of the control apparatus 20 determines whether the user 12 has arrived at the destination with reference to the positional data D1 acquired in step S105. In a case in which the user 12 has not arrived at the destination, a process in step S107 is performed. In a case in which the user 12 has arrived at the destination, the process in step S109 is performed.

Specifically, the controller 21 determines whether the position of the user 12 indicated by the positional data D1 acquired in step S105 matches the position of the destination indicated by the destination data D2 acquired in step S101. In a case in which the position of the user 12 does not match the position of the destination, the controller 21 determines that the user 12 has not arrived at the destination. In a case in which the position of the user 12 matches the position of the destination, the controller 21 determines that the user 12 has arrived at the destination.

In step S107 of FIG. 6, the controller 21 of the control apparatus 20 determines whether the user 12 has stopped off at the place 11 with reference to the positional data D1 acquired in step S105. In a case in which the user 12 has not stopped off at the place 11, the process in step S105 is performed again. In a case in which the user 12 has stopped off at the place 11, a process in step S108 is performed.

Specifically, the controller 21 determines whether the position of the user 12 indicated by the positional data D1 acquired in step S105 matches the position of the place 11 determined in step S102. In a case in which the position of the user 12 does not match the position of the place 11, the controller 21 determines that the user 12 has not stopped off at the place 11. In a case in which the position of the user 12 matches the position of the place 11, the controller 21 determines that the user 12 has stopped off at the place 11.

In step S207 of FIG. 7, the controller 31 of the first terminal apparatus 30 determines whether the user 12 has arrived at the destination with reference to the positional data D1 obtained in step S206. In a case in which the user 12 has not arrived at the destination, a process in step S208 is performed. In a case in which the user 12 has arrived at the destination, the flow of FIG. 7 ends.

Specifically, the controller 31 determines whether the position of the user 12 indicated by the positional data D1 obtained in step S206 matches the position of the destination indicated by the destination data D2 input in step S201. In a case in which the position of the user 12 does not match the position of the destination, the controller 31 determines that the user 12 has not arrived at the destination. In a case in which the position of the user 12 matches the position of the destination, the controller 31 determines that the user 12 has arrived at the destination.

In step S208 of FIG. 7, the controller 31 of the first terminal apparatus 30 determines whether the user 12 has stopped off at the place 11 with reference to the positional data D1 obtained in step S206. In a case in which the user 12 has not stopped off at the place 11, the process in step S206 is performed again. In a case in which the user 12 has stopped off at the place 11, the flow of FIG. 7 ends.

Specifically, the controller 31 determines whether the position of the user 12 indicated by the positional data D1 obtained in step S206 matches the position of the place 11 that is promoted by the advertisement acquired in step S203. In a case in which the position of the user 12 does not match the position of the place 11, the controller 31 determines that the user 12 has not stopped off at the place 11. In a case in which the position of the user 12 matches the position of the place 11, the controller 31 determines that the user 12 has stopped off at the place 11.

In step S108 of FIG. 6, the controller 21 of the control apparatus 20 determines a discount on a boarding fee for the vehicle 13.

In the example of FIG. 2, the controller 21 of the control apparatus 20 determines the boarding fee for the vehicle 13 to be halved.

The boarding fee for the vehicle 13 may not be discounted in a case in which the user 12 has merely stopped off at the place 11, and the boarding fee for the vehicle 13 may be discounted in a case in which the user 12 has purchased an item at the place 11. Specifically, the controller 21 of the control apparatus 20 may determine a discount on the boarding fee for the vehicle 13 upon determining that the user 12 has stopped off at the place 11 and receiving a notification that the user 12 has purchased an item at the place 11. The notification that the user 12 has purchased an item at the place 11 may be transmitted from the first terminal apparatus 30 to the control apparatus 20, or may be transmitted from the third terminal apparatus 50 to the control apparatus 20. For example, if the third terminal apparatus 50 is a POS device, the notification that the user 12 has purchased an item at the place 11 may be transmitted to the control apparatus 20 at the time of payment of the purchase price for the item.

In the example of FIG. 2, the controller 21 of the control apparatus 20 may determine the boarding fee for the vehicle 13 to be halved upon determining that the user 12 has stopped off at sporting goods store Y and receiving a notification that the user 12 has purchased a team X jersey at sporting goods store Y.

The boarding fee for the vehicle 13 may not be discounted in a case in which the user 12 has merely stopped off at the place 11, and the boarding fee for the vehicle 13 may be discounted in a case in which the user 12 has used a service at the place 11. Specifically, the controller 21 of the control apparatus 20 may determine a discount on the boarding fee for the vehicle 13 upon determining that the user 12 has stopped off at the place 11 and receiving a notification that the user 12 has used a service at the place 11. The notification that the user 12 has used a service at the place 11 may be transmitted from the first terminal apparatus 30 to the control apparatus 20, or may be transmitted from the third terminal apparatus 50 to the control apparatus 20. For example, if the third terminal apparatus 50 is a POS device, the notification that the user 12 has used a service at the place 11 may be transmitted to the control apparatus 20 at the time of payment of the usage fee for the service.

In the example of FIG. 2, the controller 21 of the control apparatus 20 may determine the boarding fee for the vehicle 13 to be halved upon determining that the user 12 has stopped off at sporting goods store Y and receiving a notification that the user 12 has joined a team X fan club at sporting goods store Y.

In step S109 of FIG. 6, the controller 21 of the control apparatus 20 determines whether the user 12 has arrived at the destination with reference to the positional data D1 acquired in step S105, in the same manner as the process in step S106. In a case in which the user 12 has not arrived at the destination, the process in step S109 is performed again. In a case in which the user 12 has arrived at the destination, a process in step S110 is performed.

In step S110 of FIG. 6, the controller 21 of the control apparatus 20 executes payment processing of the boarding fee for the vehicle 13. In a case in which a discount is determined in step S108, the payment processing is executed with the discounted amount. As the payment processing method, any method can be used. For example, a method can be used in which the amount of the boarding fee is charged to a credit card or a bank account registered in advance in association with the user 12. Alternatively, a method can be used in which information regarding the amount of the boarding fee and a credit card or a debit card of the user 12 is received via the second terminal apparatus 40, or a dedicated terminal mounted or installed in the vehicle 13, and the amount of the boarding fee is charged to a corresponding credit card or bank account.

As described above, in the present embodiment, the controller 21 of the control apparatus 20 determines whether a user 12 who travels in a vehicle 13 has stopped off at a place 11 different from a destination, with reference to positional data D1 indicating the position of the user 12, the user 12 having accepted a recommendation to stop off at the place 11 using the vehicle 13, the recommendation being presented together with an advertisement promoting the place 11.

Suppose that the user 12 has stopped off at the place 11 on the way to the destination using the vehicle 13. In this case, according to the present embodiment, it is known at least that the user 12 has stopped off at the place 11. Therefore, the recommendation to stop off at the place 11 can be regarded to be effective. Alternatively, suppose that the user 12 has arrived at the destination using the vehicle 13 without stopping off at the place 11. In this case, according to the present embodiment, it is known that the user 12 has not stopped off at the place 11. Therefore, the recommendation to stop off at the place 11 can be regarded to be ineffective.

In the present embodiment, the controller 21 of the control apparatus 20 determines that the user 12 has stopped off at the place 11, in a case in which the position of the user 12 indicated by the positional data D1, which changes as the user 12 travels, matches the position of the place 11 before matching the position of the destination.

According to the present embodiment, whether the user 12 has stopped off at the place 11 can be determined with high accuracy.

As a variation of the present embodiment, the process in step S206 of FIG. 7 may be performed periodically in periods and intervals that are specified from the control apparatus 20, or may be performed non-periodically at time points specified from the control apparatus 20. In such cases, the processes in step S207 and step S208 can be omitted.

As a variation of the present embodiment, processes corresponding to the processes from step S201 to step S205 of FIG. 7 may be performed by the second terminal apparatus 40.

As a variation of the present embodiment, a process corresponding to the process in step S206 of FIG. 7 may be performed by the second terminal apparatus 40. That is, instead of the result of measuring the position of the first terminal apparatus 30, a result of measuring the position of the second terminal apparatus 40 may be transmitted and received as the positional data D1 indicating the position of the user 12.

In this variation, in a case in which the recommendation to stop off at the place 11 using the vehicle 13 has been accepted by the user 12, the positioner 46 of the second terminal apparatus 40 measures the position of the second terminal apparatus 40. The controller 41 of the second terminal apparatus 40 controls the communication interface 43 to transmit a result of measuring the position by the positioner 46. The communication interface 43 transmits, to the control apparatus 20, the result of measuring the position by the positioner 46 as positional data D1 indicating the position of the user 12 on board the vehicle 13.

In step S105 of FIG. 6, the communication interface 23 of the control apparatus 20 receives the positional data D1 transmitted from the second terminal apparatus 40. The controller 21 of the control apparatus 20 acquires the positional data D1 received by the communication interface 23.

As a further variation, processes corresponding to the processes in step S207 and step S208 of FIG. 7 may be performed by the second terminal apparatus 40. Alternatively, a process corresponding to the process in step S206 may be performed by the second terminal apparatus 40 periodically in periods and intervals that are specified from the control apparatus 20, or may be performed by the second terminal apparatus 40 non-periodically at time points specified from the control apparatus 20. In such cases, the processes in step S207 and step S208 can be omitted.

The present disclosure is not limited to the embodiments described above. For example, a plurality of blocks described in the block diagrams may be integrated, or a block may be divided. Instead of executing a plurality of steps described in the flowcharts in chronological order in accordance with the description, the plurality of steps may be executed in parallel or in a different order according to the processing capability of the apparatus that executes each step, or as required. Other modifications can be made without departing from the spirit of the present disclosure.

For example, the control apparatus 20 may be mounted or installed in the vehicle 13. In that case, at least part of the operations of the second terminal apparatus 40 may be performed by the control apparatus 20. The second terminal apparatus 40 may be integrated with the control apparatus 20.

The invention claimed is:

1. A control apparatus comprising a controller configured to:
select, from map data, a place that is different from a destination, the place selling an item related to the destination or providing a service related to the destination;
determine whether a user who travels in a vehicle has stopped off at the selected place, with reference to positional data indicating a position of the user, the user having accepted a recommendation to stop off at the selected place en route to the destination using the vehicle, the recommendation being presented together with an advertisement promoting the selected place;
apply a discount to a boarding fee for the vehicle upon determining that the user has stopped off at the selected place and receiving, from a point of sale device installed at the selected place or held by a staff member of the selected place, a notification that the user has purchased the item at the selected place or the user has used the service at the selected place, the notification being transmitted from the point of sale device at a time of payment of a purchase price for the item or at a time of payment of a usage fee for the service; and
execute payment processing of the boarding fee upon determining that the user has arrived at the destination.

2. The control apparatus according to claim 1, wherein the controller determines that the user has stopped off at the place, in a case in which the position of the user indicated by the positional data, which changes as the user travels, matches a position of the place before matching a position of the destination.

3. The control apparatus according to claim 1 further comprising a communication interface configured to receive a result of measuring a position of a terminal apparatus of the user from the terminal apparatus,
wherein the controller is configured to refer to the result of measuring the position received by the communication interface as the positional data.

4. The control apparatus according to claim 1 further comprising a communication interface configured to receive a result of measuring a position of a terminal apparatus mounted or installed in the vehicle from the terminal apparatus,
wherein the controller is configured to refer to the result of measuring the position received by the communication interface as the positional data.

5. The control apparatus according to claim 1, wherein the controller is configured to determine the place according to the destination before the recommendation is presented together with the advertisement to the user.

6. The control apparatus according to claim 1, wherein the controller is configured to determine the place according to a position of the vehicle before the recommendation is presented together with the advertisement to the user.

7. The control apparatus according to claim 1, wherein the controller is configured to determine the place according to a location at which the user boards, before the recommendation is presented together with the advertisement to the user.

8. A determination method comprising:
selecting, by a control apparatus, from map data, a place that is different from a destination, the place selling an item related to the destination or providing a service related to the destination;
receiving, by the control apparatus, positional data indicating a position of a user who travels in a vehicle from a terminal apparatus configured to present, to the user, a recommendation to stop off at the selected place en route to the destination using the vehicle together with an advertisement promoting the selected place;
determining, by the control apparatus, whether the user has stopped off at the selected place with reference to the positional data; and
applying, by the control apparatus, a discount to a boarding fee for the vehicle upon determining that the user has stopped off at the selected place and receiving, from a point of sale device installed at the selected place or held by a staff member of the selected place, a notification that the user has purchased the item at the selected place or the user has used the service at the selected place, the notification being transmitted from the point of sale device at a time of payment of a purchase price for the item or at a time of payment of a usage fee for the service; and executing, by the control apparatus, payment processing of the boarding fee upon determining that the user has arrived at the destination.

9. The determination method according to claim 8, wherein the determining includes determining that the user has stopped off at the place, in a case in which the position of the user indicated by the positional data, which changes as the user travels, matches a position of the place before matching a position of the destination.

10. The determination method according to claim 8 further comprising receiving, by the control apparatus, a result of measuring a position of the terminal apparatus from the terminal apparatus, wherein the determining includes referring to the result of measuring the position as the positional data.

11. The method according to claim 8 further comprising determining, by the control apparatus, the place according to the destination before the recommendation is presented together with the advertisement to the user.

12. The method according to claim 8 further comprising determining, by the control apparatus, the place according to a position of the vehicle before the recommendation is presented together with the advertisement to the user.

13. The method according to claim 8 further comprising determining, by the control apparatus, the place according to a location at which the user boards, before the recommendation is presented together with the advertisement to the user.

14. A system comprising:
a control apparatus configured to:
  select, from map data, a place that is different from a destination, the place selling an item related to the destination or providing a service related to the destination; and
  determine whether a user who travels in a vehicle has stopped off at the selected place, with reference to positional data indicating a position of the user, the user having accepted a recommendation to stop off at the selected place en route to the destination using the vehicle, the recommendation being presented together with an advertisement promoting the selected place; and
a point of sale device configured to transmit, to the control apparatus, a notification that the user has purchased the item at the selected place or the user has used the service at the selected place, at a time of payment of a purchase price for the item or at a time of payment of a usage fee for the service,
wherein the control apparatus is further configured to:
  apply a discount to a boarding fee for the vehicle upon determining that the user has stopped off at the selected place and receiving the notification from the point of sale device; and
  execute payment processing of the boarding fee upon determining that the user has arrived at the destination.

* * * * *